(No Model.) 5 Sheets—Sheet 2.
E. H. GOLLINGS.
ROTARY ENGINE.

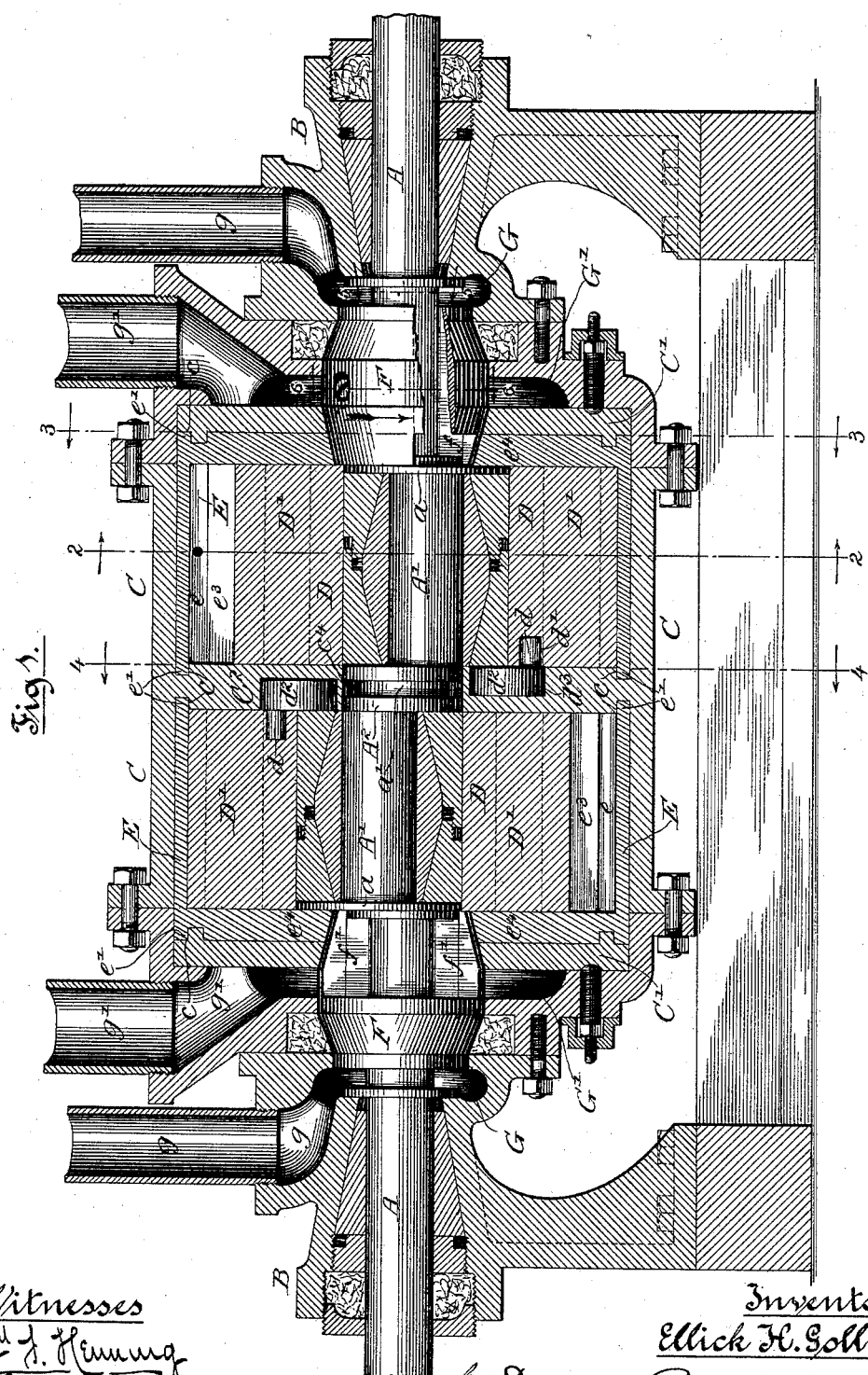

No. 448,607. Patented Mar. 17, 1891.

Witnesses
Wm. F. Henning
Louis M. F. Whitehead

Inventor
Ellick H. Gollings
by Dayton, Poole & Brown.
Attorneys.

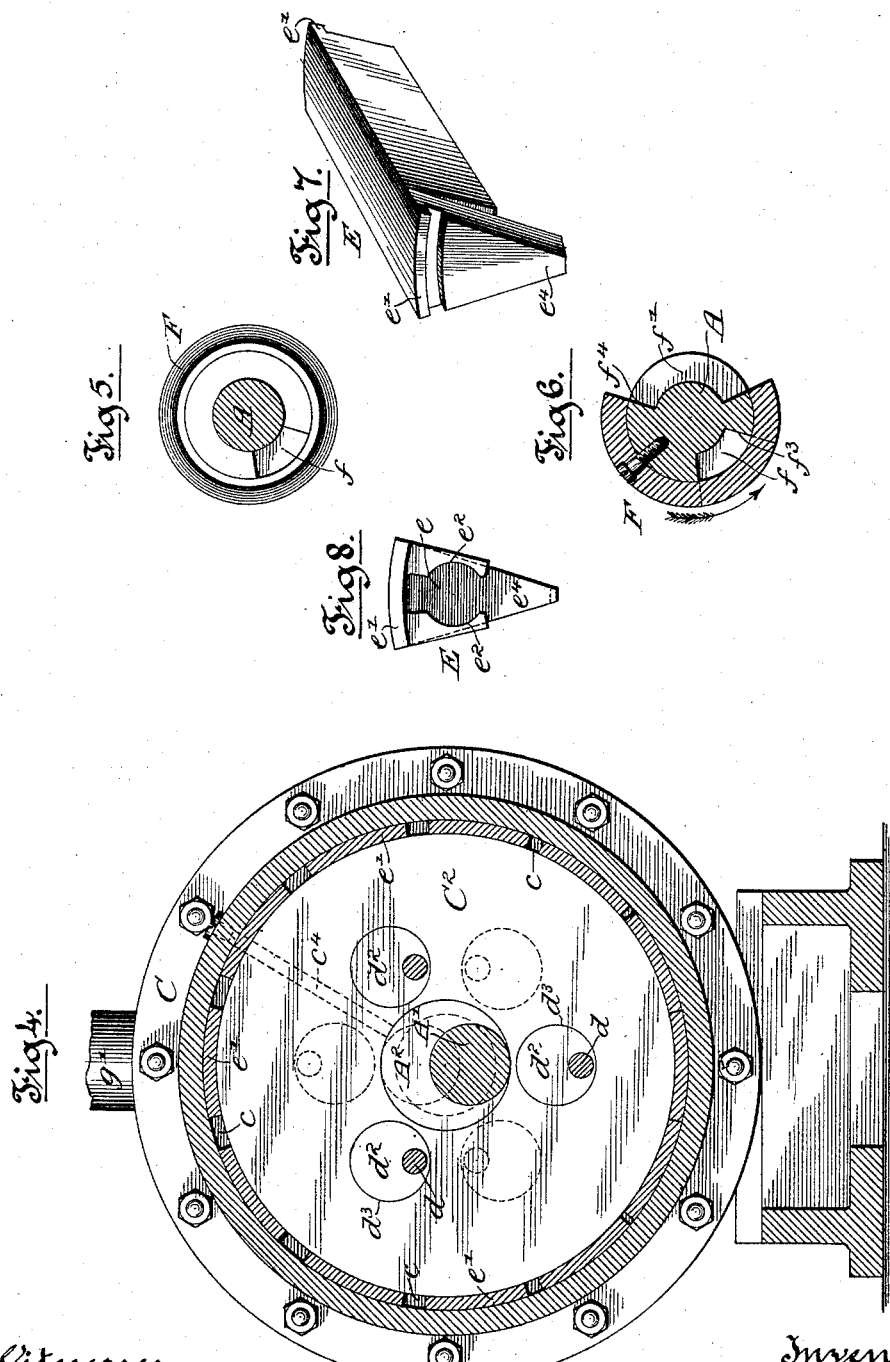

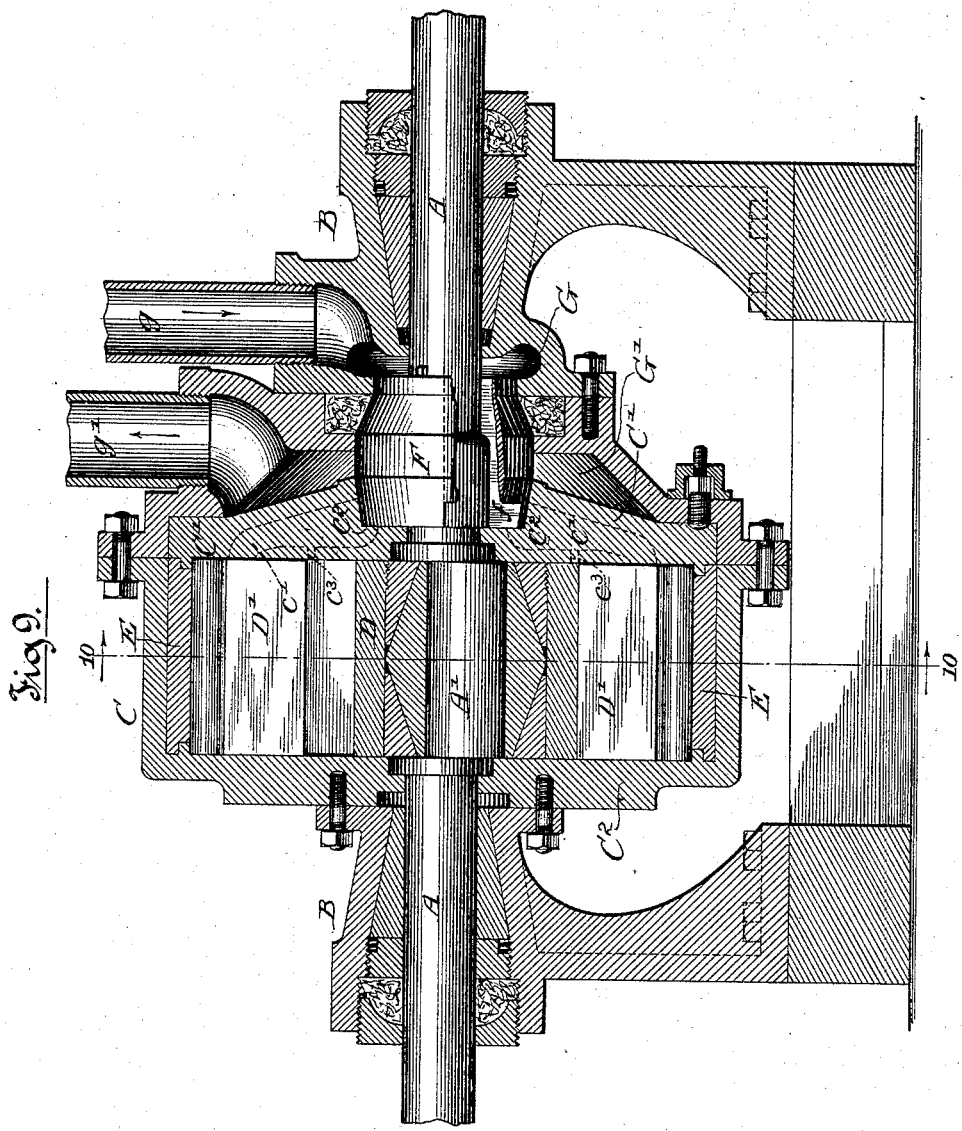

(No Model.) 5 Sheets—Sheet 5.
E. H. GOLLINGS.
ROTARY ENGINE.
No. 448,607. Patented Mar. 17, 1891.
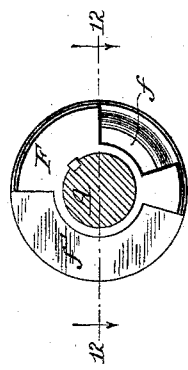
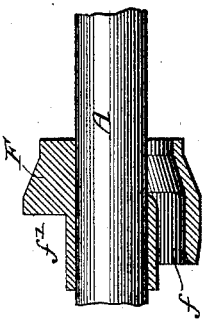
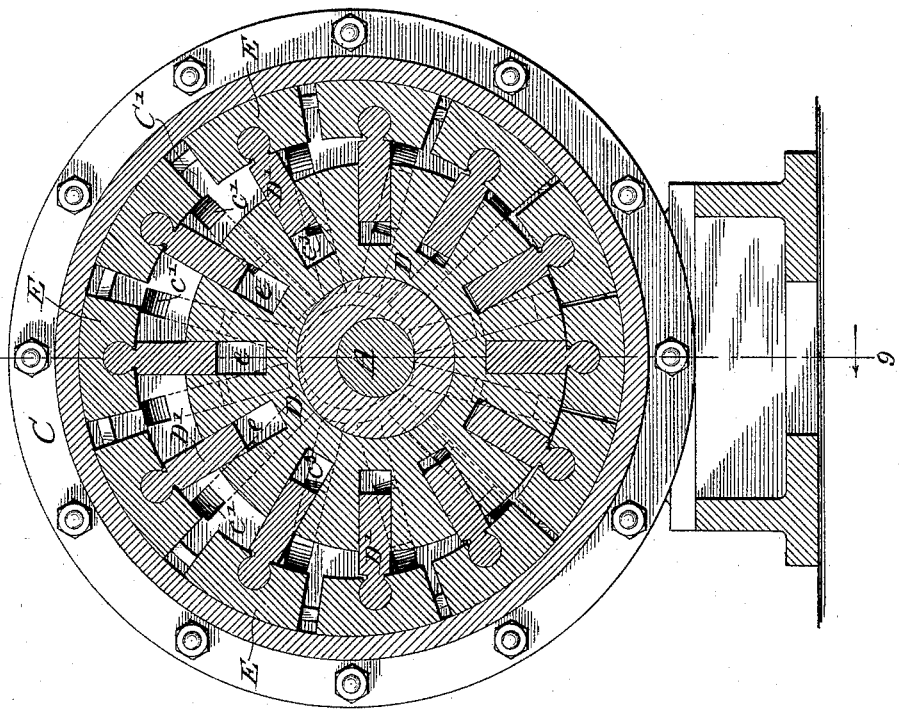
Witnesses
Wm. F. Henning
Louis M. F. Whitehead
Inventor
Ellick H. Gollings
by Dayton, Poole & Brown.
Attorneys.

UNITED STATES PATENT OFFICE.

ELLICK H. GOLLINGS, OF CHICAGO, ILLINOIS.

ROTARY ENGINE.

SPECIFICATION forming part of Letters Patent No. 448,607, dated March 17, 1891.

Application filed October 11, 1890. Serial No. 367,786. (No model.)

*To all whom it may concern:*

Be it known that I, ELLICK H. GOLLINGS, of Chicago, in the county of Cook and State of Illinois, have invented certain new and useful Improvements in Rotary Engines; and I do hereby declare that the following is a full, clear, and exact description thereof, reference being had to the accompanying drawings, and to the letters of reference marked thereon, which form a part of this specification.

This invention relates to rotary engines of the class in which a shaft passes into or through a cylindric shell that is concentric with the shaft, the said shaft having an eccentric portion within the shell, on which is mounted a gyrating wheel provided with wings which are radially extensible, so as to maintain contact with the inner periphery of the shell in the revolution of the eccentric-bearing shaft.
In general the engine resembles the rotary pump set forth in my applications for patent, Serial Nos. 301,675, filed March 1, 1889; 315,250, filed June 22, 1889; 333,766, filed December 14, 1889; 333,767, filed December 14, 1889;
353,689, filed May 31, 1890, and 353,690, filed May 31, 1890, but has special features of construction to adapt the device to economical use as a steam-engine.

The nature of the invention and the particular improvements herein claimed will fully appear from the following description of the accompanying drawings, in which—

Figure 3:
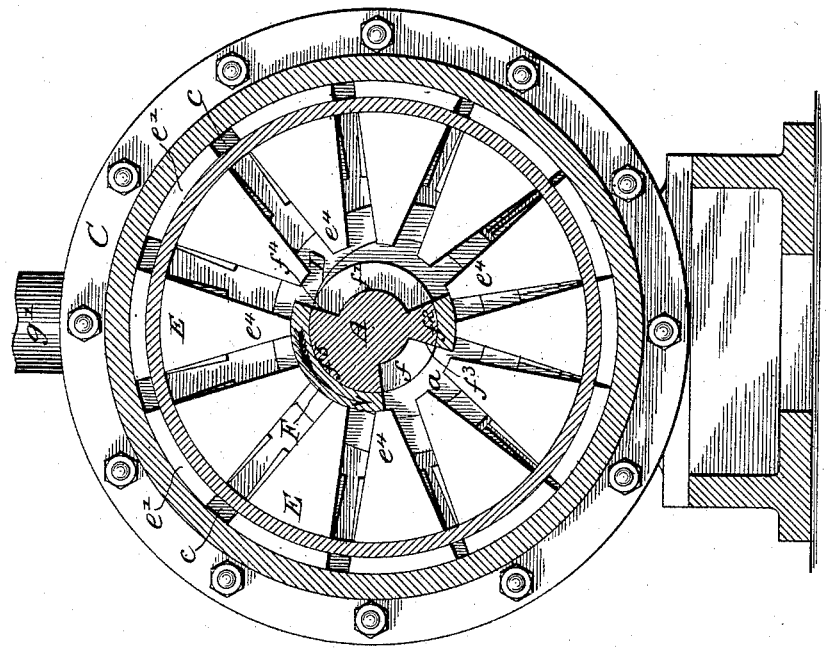
Figure 2:
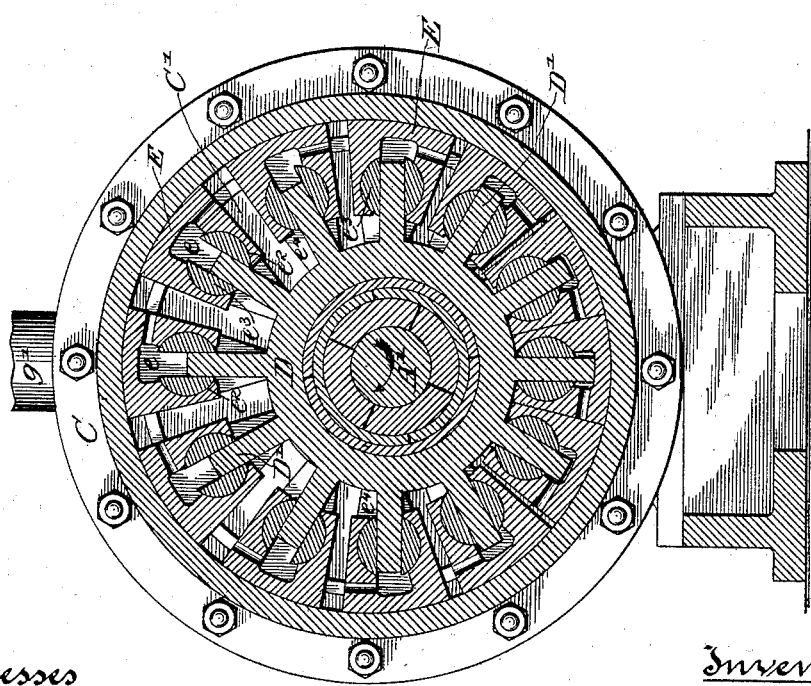

Figure 1 is a longitudinal axial section of a double or duplex steam-engine containing my present improvements. Fig. 2 is a vertical transverse section in the line 2 2 of Fig. 1. Fig. 3 is a vertical transverse section in the line 3 3 of Fig. 1. Fig. 4 is a vertical section in the line 4 4 of Fig. 1. Fig. 5 is an elevation of the outer end of the revolving sleeve which contains the steam and exhaust ports, as seen by a section in the line 5 5, Fig. 1. Fig. 6 is a section of said port-sleeve and the shaft on which it is mounted on the line 6 6 of Fig. 1. Fig. 7 is a perspective view of one of the parts or blocks which form extensions of the several wings of the eccentric wheel detached. Fig. 8 is an end view of one of said extension-blocks. Figs. 9, 10, 11, and 12 are views of modifications, Fig. 9 being an axial section of a single engine; Fig. 10, a transverse vertical section in the line 10 10 of Fig. 9; Fig. 11, a view of the inner or delivery end of the revolving port-sleeve mounted on the concentric portion of the shaft, which is shown in section; and Fig. 12, an axial section of said port-sleeve in the line 12 12 of Fig. 11.

First describing Figs. 1 to 8, inclusive, A is a shaft revolving in a suitable bearing or bearings B. C is a cylindric shell concentric with the shaft A and having parallel heads $C'$ $C^2$. Within the shell C the shaft A has an eccentric portion $A'$, and on this eccentric part of the shaft is mounted a wheel or hub D, having equal-spaced radial wings $D'$ $D'$. E E are blocks extending from one head to the other of the shell and adapted to form extensions of the several wings $D'$ of the wheel D. These extension-blocks E are retained in contact with the inner periphery of the shell by means of curved tongues $e'$ on their opposite ends, which run in corresponding annular grooves $c\ c$, formed in the heads $C'$ $C^2$ of the shell. Being thus retained in contact with the circumferential wall of the shell while the winged wheel D moves toward and from each point of the said shell-wall successively, a movement between the wheel and the extension-blocks is provided for by making said blocks with slots $e$, which admit the ends of the wings $D'$; but as the eccentric wings $D'$ are not exactly radial to the shell except in the plane of the throw of the eccentric, and as it is desirable to have a close fit of the wings $D'$ in the slots $e$, the latter are provided with parti-cylindric recesses $e^2$, one at each side of the slot $e$, and into these recesses are fitted correspondingly-shaped segments $e^3$ of cylinders, the flat proximate faces of which bear on opposite sides of the wing $D'$, and therefore allow a relatively rocking motion of the wing with respect to its extension-block in the gyration of the eccentric wheel. For the purpose of reducing the clearance of the engine as much as possible the blocks E are made of such dimensions as to fill the radial space between the hub and shell and to laterally touch each other on the side of the throw of the eccentric, as shown in Fig. 2.

The eccentrically-mounted hub or wheel D is prevented from rotating and is caused to merely gyrate by the rotation of the shaft A and its eccentric portion A' by suitable engagement thereof with the non-rotating head of the shell. Such engagement is herein shown to consist of revoluble pins $d$, fitted to rotate in holes $d'$ in the end of the hub. The revolution of the pins $d$ is provided for by mounting them on circular plates $d^2$, fitted to turn in similarly-shaped recesses $d^3$ in the shell-head $C^2$. The pins $d$ are virtually cranks, having, of course, the same throw as the eccentric A', and they necessarily prevent the revolution of the eccentric wheel with the eccentric on which it is mounted, while permitting it to gyrate within the shell under the revolving action of said eccentric.

Each of the extension-blocks E is provided at one end with a segmental inwardly directed projection $e^4$, the sides of which converge at a smaller angle than the sides of said extension-blocks, so as to leave spaces between said projections even when the bodies of the extension-blocks themselves are brought together. This is illustrated in Fig. 3. The spaces between the segmental projections $e^4$ are the passages through which the steam is fed and discharged to and from the spaces between the hub and shell.

For the purpose of supplying and exhausting steam the concentric portion A of the shaft is provided with a double port-sleeve F, secured to said shaft and rotating therewith. This sleeve has a steam-passage $f$, which opens at its delivery end opposite the ends of the segmental projections $e^4$ of the wing-extension blocks E, and said opening is shown in Fig. 3 to embrace about three of the spaces between said projections $e^4$ adjacent to the eccentric. The exhaust-port $f'$ is arranged opposite the inlet-port $f$, and is of greater width than the latter, having communication with a greater number of said spaces between the projections $e^4$. The inlet-port $f$ at its receiving end is in constant communication with an annular space G, formed in a stationary part of the machine and supplied by steam through a pipe or passage $g$. The exhaust-port $f'$ communicates through the side of the port-sleeve with an annular steam-chamber G', formed in a stationary casting of the machine and connected with an exhaust passage or pipe $g'$. These ports can be reversed in their positions, and the dimensions of either may be varied according to the judgment of the constructor.

The general space between the wheel or hub D and the surrounding shell may be considered as being diametrically divided by two opposite wings of said wheel in the plane of the eccentric, and such division therefore constantly revolves with said eccentric. In one of these two halves of the general space—namely, in that half from which the eccentric portion A' of the shaft is receding—the subordinate spaces are constantly enlarging, while the spaces in the opposite half are being constantly contracted. The admission of steam into the enlarging half therefore produces the expansion of said space and the movement of the eccentric with the result of rotating the shaft, the exhaust meantime taking place from the opposite half. The port-sleeve F is constructed and arranged to give the necessary communications with the two halves or spaces mentioned to produce these results. The arrow applied to the port-sleeve in Figs. 3 and 6 indicates the direction in which the shaft is intended to rotate in the illustration given, and from Fig. 3 it will be seen that the block-projections $e^4$ extend into contact with said sleeve. The division $f^2$ between the ports $f$ and $f'$ should cover at least one gap or space between the parts $e^4$, and the wall $f^3$ of said division bounding the inlet-port $f$ should be located as nearly as possible in the plane of the eccentric, but never in advance of it. The advanced wall $f^4$ of the outlet-port should also be located as nearly as practicable in said plane, but not in advance of it. The width of the division $f^5$ between the inlet and outlet ports determines the extent to which steam will act expansively, serving as a cut-off for all of the minor spaces which it covers and closes.

As a detail of construction I prefer to make the port-sleeve F in two parts, one part being the shaft forged or otherwise formed with projections constituting the lateral walls of the parts and the other part being an outer shell fixed to these projections and having the lateral openings shown for the inlet and outlet of steam. One advantage of this construction is that it permits the shell or sleeve proper if made conical in form, as shown in Fig. 1, to be adjusted lengthwise to compensate wear. The ends of the adjustable sleeve which abut against a ring $a$ on the shaft or in the bore of the hub D should be made relatively thin, so as to wear as rapidly as do the conical surfaces.

Sectional conical wedge-bearings are shown for the support of the hubs or wheels D from the eccentric A'; but these are not material.

Fig. 1 illustrates a duplex or double engine consisting, in fact, of two engines with its eccentrics on opposite sides of the shaft-axis. The object of this construction is to give balance to the engine, so that it may be run at high speed. The cylindric junction-piece $A^2$, uniting the proximate ends of the eccentrics, is provided with a peripheral groove $a'$, into which oil may be fed through a suitable passage $c^4$ in the head $C^2$ and from which it may be distributed to the bearings of the eccentric by any suitable ducts.

In the construction illustrated in Figs 9 and 10 the radial slots $e$, in which the wings D' slide, are formed in the hub instead of in the extension-blocks E, and said wings have only a hinge connection with said extension-blocks, as clearly indicated in Fig. 10, whereby they may rock slightly to accommodate their variations from an actual radial direction with respect to the shell and eccentric blocks. In these figures also a series of passages are provided in the stationary or non-rotating head of the shell adjacent to the revolving port-sleeve, the said passages corresponding in number with the number of wings on the eccentrically-mounted wheel; or, in other words, with the number of spaces between such wings. In Fig. 9 these passages are indicated at $c'$ by dotted lines on the section of the end plate $C'$ of the cylinder, and they are also indicated by dotted lines in Fig. 10, where their openings into the shell are shown in full lines. They are radial in direction, and their outer ends are arranged to discharge into the shell exterior to the hub or body of the wheel D, while their inner ends terminate in a recess $c^2$ in the outer face of the head $C'$, forming an enlargement of the passage through which the shaft A extends and accommodating the inner end of the port-sleeve F. The passages or ports $c'$ have branch openings $c^3$, which admit steam to the slots $e$ to balance the pressure on the wings $D'$ and permit their easy movement.

The port-sleeve viewed at its inner and delivery end in Fig. 11 and in axial section in Fig. 12 is slightly different in construction, though not in its essential character from that shown in preceding figures. It is in these figures (11 and 12) shown as formed of a single piece and secured to the shaft by means of a key.

I claim as my invention—

1. The combination of a cylindric shell, a revoluble shaft having an eccentric within the shell, a gyrating wheel or hub mounted loosely on the eccentric portion of the shaft, a series of blocks held in contact with the inner circumference of the shell and arranged to slide in the curved direction of said circumference, a corresponding series of wings permanently connecting the several blocks with the hub, said wings having a telescoping connection with one of these parts and having also pivotal connection with said blocks, and a part having two ports which communicate with the shell interior, one on one side and the other on the other side of the plane of the eccentric.

2. The combination of a cylindric shell, a revoluble shaft having an eccentric portion within said shell, a gyrating wheel or hub mounted loosely on the eccentric portion of the shaft, a series of segmental blocks arranged to slide in contact with the curved inner surface of the shell, said blocks being of suitable size to practically touch each other and the hub on that side of said hub at which the hub most nearly approaches the shell, a series of wings connecting the several sliding blocks with the hub and having pivotal connection with said blocks, and a part having two ports which communicate with the interior of the shell on opposite sides of the plane of the eccentric.

3. The combination of a cylindric shell, a revoluble shaft having an eccentric portion within said shell, a gyrating wheel or hub mounted loosely on said eccentric portion of the shaft, a series of wings fitted to slide in radial slots in the hub or wheel, a corresponding series of blocks held in contact with the inner circumference of the shell and adapted to slide along such surface, said blocks being pivotally connected with the wings, and means for introducing steam or other fluid into the shell on one side of the plane of the eccentric and for taking such steam or fluid from the shell on the opposite side of said plane.

4. The combination of a cylindric shell, an axial revoluble shaft having an eccentric portion within the shell, a gyrating wheel or hub mounted loosely on said eccentric portion of the shaft, a series of blocks held in contact with the inner periphery of the shell and adapted to slide thereon, a series of wings movably connecting the blocks severally with the hub, one head of the cylinder being provided with a series of ports opening into the shell, and means for delivering steam or other fluid into the ports which communicate with said shell interior on one side of the plane of the eccentric and for discharging the fluid from the ports communicating with the shell interior on the other side of said plane.

5. The combination of a cylindric shell, a revoluble axial shaft having an eccentric portion in said shell, a gyrating hub or wheel mounted loosely on said eccentric portion of the shaft, a series of blocks held movably in contact with the periphery of the shell, a corresponding series of wings movably connecting the blocks with the hub and permanently dividing the annular space between the hub and shell into a corresponding number of minor spaces, each having a separate passage leading thereto, and a revolving part containing two ports, one of which is for the introduction of steam and communicates with less than the whole number of said passages on one side of the plane of the eccentric, being those passages adjacent to the eccentric, and the other of which is for the exhaust of steam and communicates with the passages on the opposite side of said plane.

6. In combination with a cylindric shell, an axial shaft having an eccentric portion within the shell, and a winged wheel or hub loosely mounted on the eccentric, one or more cranks having the same throw as the eccentric and engaged with the head of the shell and also with the hub or wheel, whereby the latter is held from rotation and is caused to gyrate within the shell.

7. In a double rotary engine of the general character described, the combination, with the double eccentric shaft and the central division-plate of the shell, of an axial bearing portion of the shaft between the two eccentrics and resting in said central division of the shell, said bearing being provided with a peripheral groove for oil and the shell-partition having an oil-passage therein leading to the groove of the bearing.

In testimony that I claim the foregoing as my invention I affix my signature in presence of two witnesses.

ELLICK H. GOLLINGS.

Witnesses:
M. E. DAYTON,
TAYLOR E. BROWN.